July 1, 1930.  P. GWISDALLA  1,769,132
AIR GAUGE AND CONTROL VALVE
Filed Oct. 28, 1927
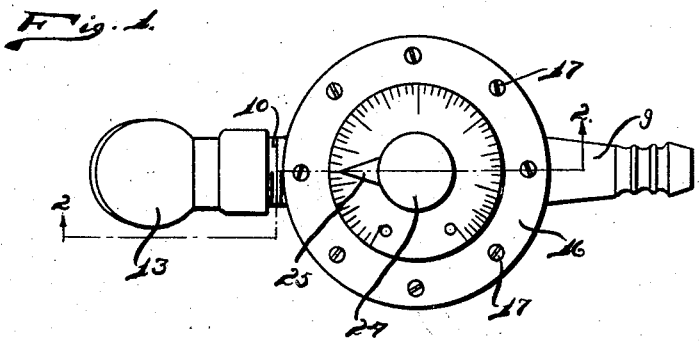
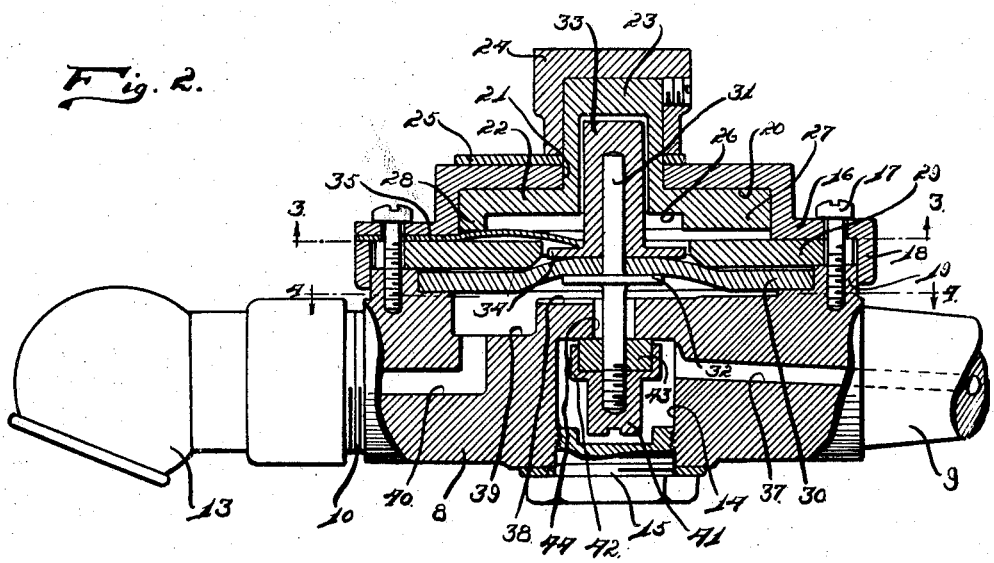
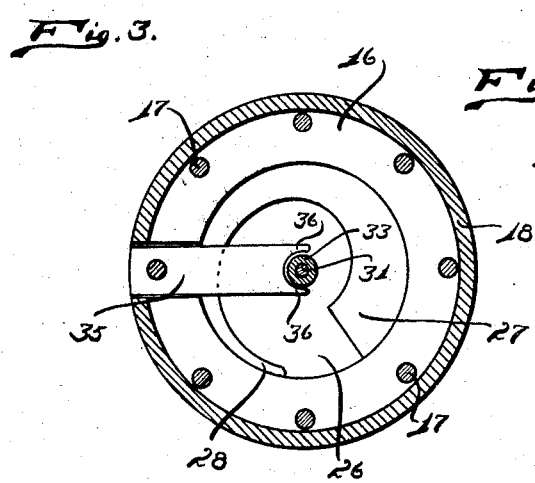
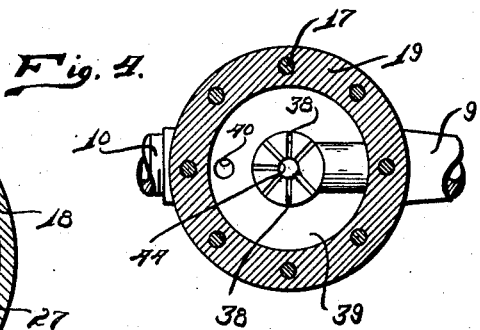
INVENTOR.
Peter Gwisdalla.
BY
ATTORNEY.

Patented July 1, 1930

1,769,132

UNITED STATES PATENT OFFICE

PETER GWISDALLA, OF DETROIT, MICHIGAN

AIR GAUGE AND CONTROL VALVE

Application filed October 28, 1927. Serial No. 229,458.

My invention relates to a new and useful improvement in an air gauge and control valve adapted for interposing in a pressure air line so that the pressure of the air built up by the air through the air line may be determined and regulated and so that when a predetermined pressure has been built up the passage of air through the air line may be automatically prevented.

The invention is particularly adapted for use on the flexible conduit or hose used at air filling stations for inflating tires, and serves to provide a means whereby the pressure of the air in the tire may be automatically controlled by an adjustment of the invention.

I am aware that there have been air scales and air measuring devices adapted for use at filling stations and the like, which may be adjusted to a certain predetermined pressure and will serve to cut off the supply of air when the predetermined pressure has been built up in the tire, but these devices are large, cumbersome and expensive, whereas the present invention is attached to the air conduit itself, is simple in structure, economical of manufacture, highly efficient in use, and inexpensive to install and maintain.

To provide such a device is an object of the present invention and to provide the detail of structure set out in the specification and drawings also forms an object of the invention.

Other objects will appear hereinafter.

The invention consists in the combination and arrangement of parts hereinafter described and claimed.

The invention will be best understood by a reference to the accompanying drawings which form a part of this specification, and in which, Fig. 1 is a top plan view of the invention.

Fig. 2 is a view taken on substantially line 2—2 of Fig. 1.

Fig. 3 is a view taken on line 3—3 of Fig. 2.

Fig. 4 is a view taken on line 4—4 of Fig. 2.

Although various modifications of the invention may be effected, it is the intention to provide a device of this class which will be small and compact so that no large weight will be added to the weight of the flexible conduit or air line itself.

In the drawings I have illustrated a housing comprising a base portion 8, projecting outwardly from one side of which is a nipple 9, upon which may be attached a hose or other suitable air conduit. A nipple 10 projects outwardly from the opposite side, and threaded upon the nipple 10 is the air nozzle 13 which is adapted to fit over the valve stem of a tire, this nozzle 13 being of conventional type and of a structure well known.

Formed in the base portion 8 is a recess 14 closed at its lower end by a suitable plug 15, this plug making an airtight connection. A cover 16 is provided for the base portion 8, and is secured to the base portion by screws 17 threaded thereinto. A flange 18 is adapted to embrace the upwardly projecting flange 19 on the base portion 8. The cover is provided with a recess 20, thus making a sort of cup-shaped cover 16. In the top of the cover there is provided an opening 21. Rotatably mounted in the recess 20 is a disc 22 having a neck 23 projecting through the opening 21 and upon which is mounted a knob 24 and a pointer 25 rotating therewith. The lower face of the disc 22 is provided with the recess 26, this recess being formed eccentric so that the disc 22 is thicker at its periphery than at its center, the thick portion tapering from the wide end 27 to the narrow end 28. Engaging between the flange 19 and the cover 16 is a disc 29 through which the bolts or screws 17 also project, this disc 29 having a central opening. Positioned below the disc 29 and engaging at its periphery the inner surface of the flange 19 is a flexible disc 30 preferably made from rubber, leather, or other suitable material. A stem 31 is projected through this flexible disc 30, this stem 31 carrying the disc 32 intermediate its ends, to which the flexible disc 30 is attached by gluing or in any other suitable manner. The stem 31 projects into a cup-shaped member 33 which loosely engages in the neck 23, a concentric flange 34 projecting outwardly from the open end of the cup-shaped member 33, this flange being also secured to the disc 30 by cementing or otherwise. The stem 31 is pressed into the cup-shaped member 33 with a press fit. A leaf spring 35 is engaged between the disc 29 and the cover 16, and extends inwardly so as to embrace the neck 33 at its juncture with the flange 34 at its bifurcations 36, this spring 35 being bent downwardly as shown in Fig. 2.

It will be noted that the spring engages the undersurface of the disc 22 so that the edge of the undersurface of the disc 22 which engages the spring serves to determine the point at which the spring will flex when pressure is exerted upon its free end.

It is evident that as the disc 22 is rotated and the broader portion 27 of the undersurface of the disc 22 is brought into engagement therewith, the length of the spring 35 which may flex is considerably shortened. This shortening of the bending or moving portion of the spring 35 is gradually accomplished as the disc 22 is rotated.

Extending through the nipple 9 and through the base portion 8 so as to communicate with the recess 14 is a passageway 37. Formed on the upper surface of the base portion 8, centrally thereof, are radially extending grooves 38 which serve as a means for communicating the passage 37 with the recess 39 which communicates with the passage 40 leading through the nipple 10 into the nozzle 13.

The rod 31 is projected through the opening 44 formed in the base portion so that the grooves 38 may communicate with the recess 14.

Threaded on the lower end of the stem or rod 31 is a valve plug 41 having a cup-shaped portion 42 in which is positioned packing 43 made from rubber, leather, or other suitable yieldable material.

It is believed evident that when the packing 43 is moved upwardly into the position shown in Fig. 2 that communication between the opening 38 and the passage 37 is closed, the packing 43 serving as an efficient seal.

In operation, when the device is assembled, as shown in Fig. 2, and it is desired to inflate a tire or to pass air through the nozzle 13 to build up a predetermined pressure, the pointer 25 is turned to indicate, by the graduations 45 formed on the outer surface of the cover 16, the desired pressure. When this pointer is turned to the position desired the lower surface of the disc 22 will have been moved so that the proper width thereof is in engagement with the spring 35, this spring 35 serving normally to press downwardly on the flange 34 so as to retain the packing 43 free from engagement with the base portion 8, thus maintaining communication between the passage 37 and the passage 40. The passage 37 communicating with the larger compartment 14 will serve to deliver the air through the opening 44 and the passage 40 until the pressure has been built up which is desired. When the pressure desired has been built up sufficient upward pressure will be exerted on the flexible member 30 and the disc 32 to flex the spring 35 upwardly and thus bring the packing 43 into engagement with the base portion 8 so as to close the opening 44.

When the wider portion of the disc 22 engages the spring 35 a greater strain is necessary in order to flex the spring 35 upwardly. The pressure of the spring 35, therefore, varies in direct proportion to the width of the surface of the disc 22 which engages it, this surface being of a shape which may properly be termed a cam surface. Consequently, the pressure necessary to move the valve, which comprises the plug 41, the cup-shaped portion 42 and the packing 43, into closing position, varies directly in proportion to the width of the cam which engages the spring 35.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

1. A control valve of the class described adapted for controlling the flow of fluid through a pressure line, comprising: a main body having an inlet port and an outlet port, said inlet port communicating with said pressure line; means for opening and closing communication between said inlet port and said outlet port, said means moving to closed position in response to the pressure built up intermediate said inlet port and said outlet port; yieldable means for normally resisting movement of said opening and closing means to closed position; and means engageable with said resistance means varying in width from one end to the other and movable relatively to said resistance means for bringing different widths thereof into engagement with said resistance means and varying the resistance of the same.

2. A control valve of the class described adapted for controlling the flow of fluid through a pressure line, comprising: a main body having an inlet port and an outlet port, said inlet port communicating with said pressure line; means for opening and closing communication between said inlet port and said outlet port, said means moving to closed position in response to the pressure built up intermediate said inlet port and said outlet port; yieldable means for normally resisting movement of said opening and closing means to closed position; and means engageable with said resistance means varying in width from one end to the other and movable relatively to said resistance means for bringing different widths thereof into engagement with said resistance means and varying the resistance of the same directly in proportion to the width engaging therewith.

3. A control valve of the class described, comprising: a main body having an inlet and an outlet port communicating with each other through an expansion chamber; a valve movably positioned in said expansion chamber for closing communication of said outlet port therewith; yieldable means normally resisting movement of said valve to closing position; and a rotatable member having an engaging surface for engaging said resistance means, the width of said engaging surface varying from end to end, the variation of the width of said engaging surface varying in direct proportion to the resistance of said resistance means.

4. A control valve of the class described comprising: a main body having an inlet port and an outlet port communicating with each other through an expansion chamber; a valve movably positioned in said expansion chamber for closing communication of said outlet port with said inlet port; yieldable means connected to said valve; a cover for said main body; a leaf spring clamped on said main body by said cover and normally resisting movement of said yieldable means and said valve in one direction and tending to retain said valve in open position; and rotatable means enclosed by said cover and engaging said leaf spring and being of varied width throughout its length at the engagement portion for regulating the length of the flexing portion of said leaf spring.

In testimony whereof I have signed the foregoing specification.

PETER GWISDALLA.